July 13, 1965
K. E. ERICKSON
3,194,109
INTERFEROMETRIC DEVICE FOR DETERMINING
DEVIATIONS FROM PLANAR MOTION
Filed Sept. 11, 1961
2 Sheets-Sheet 1
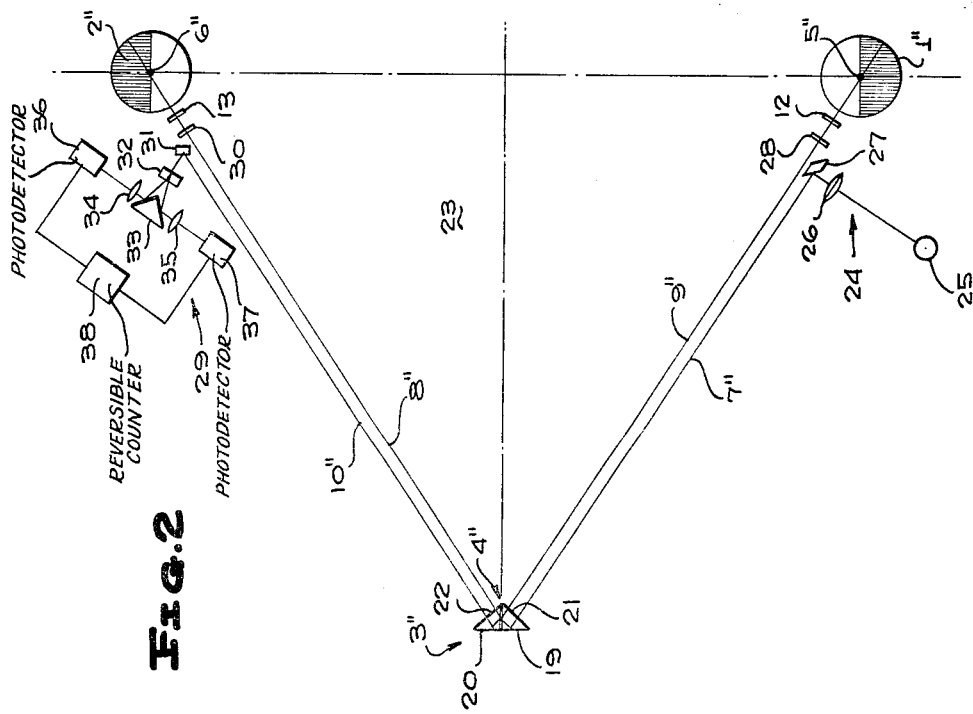
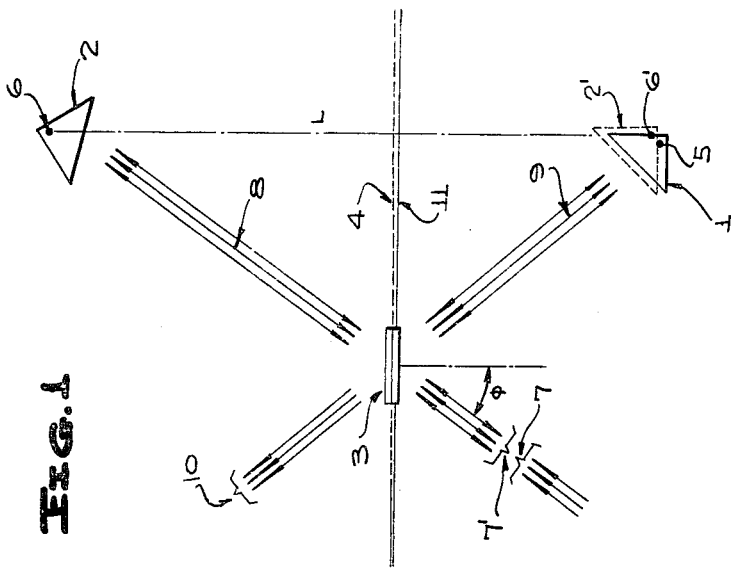
INVENTOR
KENT E. ERICKSON
BY Hurvitz + Rose
ATTORNEYS July 13, 1965 K. E. ERICKSON 3,194,109
INTERFEROMETRIC DEVICE FOR DETERMINING
DEVIATIONS FROM PLANAR MOTION
Filed Sept. 11, 1961 2 Sheets-Sheet 2
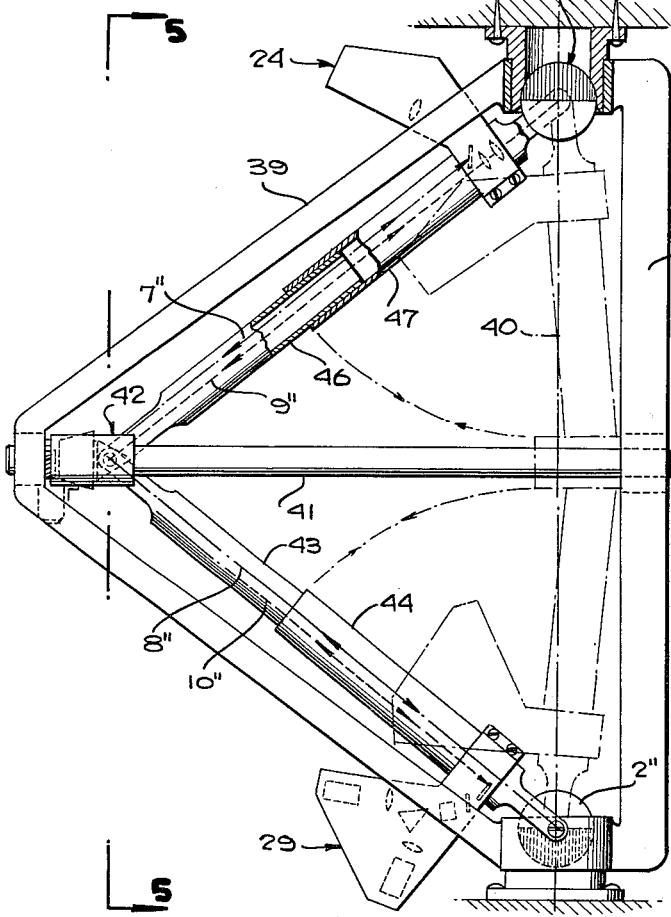
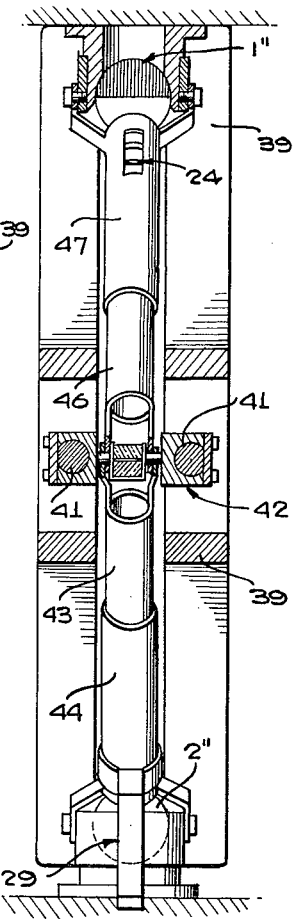
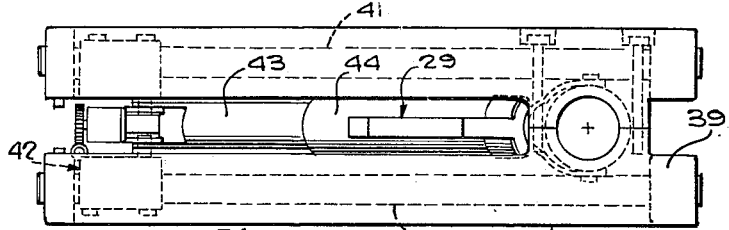
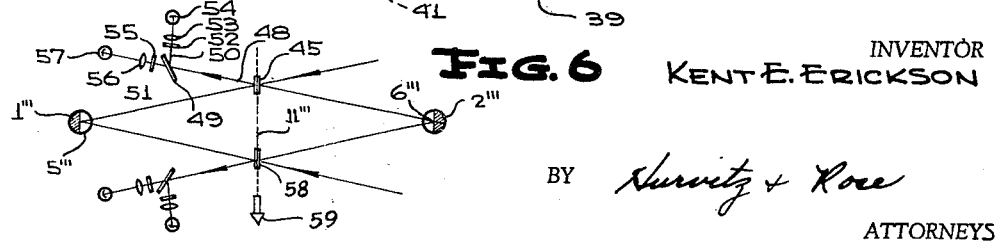
INVENTOR
KENT E. ERICKSON
BY Hurvitz + Rose
ATTORNEYS

3,194,109
INTERFEROMETRIC DEVICE FOR DETERMINING DEVIATIONS FROM PLANAR MOTION
Kent E. Erickson, 2811 N. Howard St., Baltimore, Md.
Filed Sept. 11, 1961, Ser. No. 137,335
11 Claims. (Cl. 88—14)

The present invention relates to a system for measuring displacements and more particularly to an optical system for measuring deviation of a member from planar or linear motion which deviations are of an order of magnitude of five microinches over distances of several feet.

An object of the present invention is to provide for digital readout of deviations of a member from planar motion by means of optical fringe counting, such readout being usable to actuate a servomechanism to preserve the planarity or linearity of the motion.

Still another object of the present invention is to provide an optical system for monitoring deviations from planar or linear motion in which the accuracy attainable and the range of motion usable are essentially independent of the size of the optical components.

Yet another object of the present invention is to provide an optical system for measuring deviations of a member from planar motion by means of optical fringe counting which deviations are of the order of magnitude of five microinches over distances of several feet.

The above and still further objects, features and advantages of the present invention will become apparent upon consideration of the following detailed description of one specific embodiment thereof, especially when taken in conjunction with the accompanying drawings, wherein:

FIGURE 1 is a schematic drawing of those optical components which stabilize the reference plane in space;

FIGURE 2 is a schematic drawing of the electrical and optical components of a preferred embodiment of the invention;

FIGURES 3, 4 and 5 are drawings of the mechanical components of a preferred embodiment of the invention; and FIGURE 6 is a schematic drawing of the optical components of a device for servo controlling the linear motion of a ruling engine.

Referring specifically to FIGURE 1 of the accompanying drawings there is illustrated a pair of matched corner reflectors denoted by the numerals 1 and 2 and a compensated beamsplitter denoted by the numeral 3. The optical centers of corner reflectors 1 and 2 are denoted by numerals 5 and 6 respectively. The plane of beamsplitter 3 is denoted by the numeral 4 and the plane which perpendicularly bissects the line joining points 5 and 6 is denoted by the numeral 11. The mirror image of corner reflector 2 formed by reflection in plane 4 is denoted by 2'; the image of point 6 is denoted by 6'. Beamsplitter 3 is mounted on a carriage, not illustrated in FIGURE 1, which is highly constrained to move in a plane. Plane 4 of beamsplitter 3 is oriented parallel to this plane of motion.

Corner reflector 1 is situated so as to coincide very closely with the mirror image 2' of corner reflector 2.

A light beam 7 from a suitable monochromatic source not illustrated in FIGURE 1 impinges upon beamsplitter 3 at an angle of incidence $\phi$ with respect to the normal. Since only low orders of interference are used, the light need not be highly monochromatic and the source may be made very bright. The light is directed so that the transmitted beam 8 illuminates corner reflector 2 and the reflected beam illuminates corner reflector 1. Beams 8 and 9 are of equal intensity. The beams 8 and 9 are reflected back to beamsplitter 3, and combine to form a transmitted beam 10 and a reflected beam 7' returning toward the source. Except for the fact that the position of the beamsplitter, and hence also the angle of incidence $\phi$, is to be variable, the situation is the same as for a conventional Michelson interferometer employing corner reflectors. The customary analysis in terms of the virtual image 2' of corner reflector 2 is well known. (See for instance "Theory of the Corner-cube Interferometer" by Edson R. Peck, Jour. of the Optical Soc. of Amer., vol. 38, p. 1015.) It is well known that if plane 4 of beamsplitter 3 essentially coincides with plane 11, the field of view included in beam 10 is covered by the zero order or "white light" fringe. Translation of beamsplitter 3 in plane 11 does not change the order of interference but translation of beamsplitter 3 in a direction normal to plane 11 changes the order of interference. Plane 11 thus serves as a reference plane in space. As the order of interference changes by unity the intensity of beam 10 varies through a complete cycle. The intensity of beam 7' also varies with the same period but may have a different phase. In order that the said variation in intensity of light be relatively large, it is necessary that less than one-fourth of a fringe be visible through the beamsplitter. The analysis as to the number of fringes visible through the beamsplitter proceeds from the well-known relation $$N\lambda = 2d \cos \theta$$

where:

$d$ is the length of the line between points 5 and 6' and the angle $\theta$ is measured from this line. N is the order of interference in the direction $\theta$ and $\lambda$ is the wavelength of the light.

It can be shown that the number of fringes visible through the beamsplitter is less than $$\frac{(d\phi)}{\lambda}\left[\frac{\alpha L}{\cos \phi}+4\Delta \sin \phi\right]$$

where:

$(d\phi)$ is the maximum angle of divergence in direction between the various rays in beam 10 or in beam 7',
$\alpha$ is the angle of inclination between plane 4 and plane 11,
$\Delta$ is the distance from plane 11 to the middle of beamsplitter 3,
$L$ is the distance between point 5 and point 6, and
$\lambda$ is the wave length of the light.

In order to meet the requirement that the number of fringes visible through the beamsplitter be no greater than one-fourth, the following restrictions may be imposed on the system:

$$\frac{1}{6} \geq \left|\frac{(d\phi)\alpha L}{\lambda \cos \phi}\right| \text{ and } \frac{1}{12} \geq \left|\frac{4(d\phi)\Delta \sin \phi}{\lambda}\right|$$

Since $|\sin \phi| \leq 1$ and $|\cos \phi| \geq \frac{1}{2}$, this gives $$|\alpha| \leq \left|\frac{\lambda}{12L(d\phi)}\right| |\Delta| \leq \left|\frac{\lambda}{48(d\phi)}\right| \quad (1)$$

The fact that both $\alpha$ and $\Delta$ must be restricted in range means that the mechanical constraints controlling the planarity of the motion of beamsplitter 3 must be sufficiently precise. It is preferable to employ collimated light in the apparatus of the invention since the permissible range of both $\alpha$ and $\Delta$ is inversely proportional to $d\phi$. In a well-collimated beam, the parameter $d\phi$ has a small value which reduces the precision required of the mechanical constraints. The restriction on $\alpha$ is more severe than the restriction on $\Delta$ as can be seen from Equations (1) above, and necessitates using moderately high precision constraints even with fairly good collimation of the light.

The variations in intensity of beams 7' and 10 may be employed to operate a reversible fringe counter, the count registered by the counter indicating the deviation of the beam-splitter 3 and therefore of the table on which it is mounted. Since the count changes with each unit change in the order of interference, the accuracy of measurement is determined in the first instance by the wavelength of the light employed. Techniques of reversible fringe counting are well known. (See for instance the article by Edson R. Peck and S. Wendell Obetz published in the Jour. of the Optical Soc. of Amer., vol. 43, p. 505 (1953).) As indicated below these techniques can be employed in the system of FIGURE 1 and also of FIGURES 2 and 6 to be discussed subsequently.

Referring now to FIGURE 2, which illustrates a preferred embodiment of the invention, numerals having double primes have functions corresponding to the numerals of FIGURE 1. Numerals 1″ and 2″ denote spherical retroreflectors and numeral 3″ denotes a beamsplitter assembly. Numerals 8″ and 9″ denote two beams that have been split from a single beam 7″ and then retrodirected to combine and produce interference in beam 10″. This system has interference properties practically equivalent to the system illustrated in FIGURE 1. The latter, however, is pedagogically simpler, hence the analysis has been given in terms of it.

Referring now specifically to FIGURE 2, retroreflector 1″ consists of a sphere with an index of refraction which ideally should be exactly 2.00. One hemisphere (indicated by shading) is silvered to give high internal reflection. If the index of refraction of sphere 1″ is 2.00, the unsilvered hemisphere acts as a lens whose principal focus lies on the silvered surface. Sphere 1″ thus has retrodirective properties. If the diameter A of beam 9″ is less than $$\sqrt[4]{8\lambda D^3}$$

(where D is the diameter of sphere 1″) spherical aberration may be neglected, i.e., a plane wave incident on sphere 1 is reflected as a wave which is plane to $$\frac{\lambda}{4}$$

Considerably more spherical aberration than this is tolerable; hence a beam diameter of .5 cm. is usable with $D=4$ cm., $\lambda=.546$ micron. An optical glass is now available with an index of refraction $n=1.962$ for the green line of mercury ($n=2.015$ for the blue line of mercury). To compensate for the fact that the index of sphere 1″ may not be exactly 2, a very weak lens 12 can be placed in beam 9″ close to sphere 1″. An alternative is to use different radii for the silvered and unsilvered hemispheres. This technique makes it possible to use a low index glass but it is then difficult to make the hemispheres concentric.

A retroreflecting sphere 2″ similar to sphere 1″ is used to retrodirect beam 8″. A weak corrective lens 13 corresponds to lens 12 and is employed with the sphere 2″. Spheres 1″ and 2″ should be of the same glass and of the same diameter. If, however, the diameters differ slightly, this may be compensated by a difference in thickness between lenses 12 and 13. Since linses 12 and 13 vary in thickness by only a few wavelengths over the apertures of beams 9″ and 8″ respectively, their positions are not extremely critical. The manner in which lenses 12 and 13 are kept centered on beams 9″ and 8″ is discussed below.

Retroreflectors 1″ and 2″ of FIGURE 2 have retrodirective properties practically equivalent to corner-cubes 1 and 2 in FIGURE 1 but they have a wider angular range and do not suffer from polarization effects from oblique internal reflections as do the corner-cubes.

Still referring specifically to FIGURE 2, beamsplitter assembly 3″ consists of two corner-cubes 19 and 20 having equal indices of refraction. The interface 4″ is coated so as to serve as a beamsplitter. The other two orthogonal faces of both corner-cubes 19 and 20 are silvered for complete reflection. The entry faces 21 and 22 of corner-cubes 19 and 20 are symmetrically located to within $$\pm\frac{\lambda}{4}$$

with respect to beamsplitting interface 4″. Entry faces 21 and 22 are approximately normal to plane 23 containing beams 8″ and 9″.

In fabrication of the beamsplitter assembly, symmetrization of faces 21 and 22 about beamsplitting interface 4″ can be achieved by the techniques employed in making Kosters prisms, especially those described by J. B. Saunders in the Journal of Research of the National Bureau of Standards, vol. 58, page 21 (1957). The principal technique involves the use of beamsplitting interface 4″ together with internal reflections from faces 21 and 22 to form a Michelson interferometer. In using this technique to adjust beamsplitter assembly 3″, the interface 4″ should be illuminated through face 21 with light that is first reflected internally from the two fully silvered faces of corner-cube 19. Fringes will be seen through face 22 in the light that has been reflected internally from the two fully silvered faces of corner-cube 20.

Numeral 24 denotes the source assembly which consists of a source 25, a collimating lens 26, a small mirror 27, a wave plate 28, and compensating lens 12. Numeral 29 denotes the detector assembly which consists of compensating lens 13, wave plate 30, small mirror 31, Wollaston prism 32, split-mirror 33, objective lenses 34 and 35, and photodetectors 36 and 37. Light from source 25 follows the path generally designated by 7″ and suffers two internal reflections from the fully silvered faces of corner-cube 19 before impinging upon the beamsplitting interface 4″. Beam 9″ reflected from interface 4″ passes normally through wave plate 28. Said wave plate retards the light polarized parallel to plane 23 by $$\frac{\lambda}{16}$$

with respect to the light polarized normal to plane 23. Beam 9″ is retrodirected by retroreflector 1″ and passes back through wave plate 28. Beam 8″ transmitted by interface 4″ passes normally through wave plate 30 which is matched to wave plate 28. Wave plate 30 retards the light polarized normal to plane 23 by $$\frac{\lambda}{16}$$

with respect to the light polarized parallel to plane 23. Beam 8″ is retrodirected by retroreflector 2 and passes back through wave plate 30.

Returning beams 8″ and 9″ are recombined at interface 4″ to produce a beam that suffers two internal reflections from the fully silvered faces of corner-cube 20 before proceeding along the path generally designated as 10″ and impinges on the mirror 31. This beam is reflected from mirror 31 through Wollaston prism 32 which separates the light polarized parallel to plane 23 from the light polarized normal to plane 23. These two polarized light beams are further separated by reflection from the split-mirror 33; one beam is focused by lens 35 on photodetector 37, the other beam is focused by lens 34 on photodetector 36. The action of wave plates 28 and 30 produces a phase difference of one-fourth fringe between the light signal received by photodetector 36 and that received by photodetector 37. The output signals from photodetectors 36 and 37 are thus suitable for operating a conventional reversible counter 38 such as that described by Peck and Obetz referred to above. The apparatus of FIGURE 2 therefore accomplishes the same results as the apparatus of FIGURE 1 but is preferred since it allows a greater range of motion for beamsplitter 3″.

Wave plates 28 and 30 can both be made from a single plane-parallel piece of quartz with the optic axis in the plane of parallelism. The piece is first cut in half and one part is polished two microns thinner than the other. Half of each of these plates is used to make wave plate 28 and the other two halves are used to make wave plate 30. In each wave plate the optic axes of the two pieces are crossed.

The light may be collimated sufficiently by simply restricting the size of mirrors 27 and 31.

The source assembly 24 is constrained to rotate rigidly in the plane 23 of the drawing about point 5″ in such a manner that wave plate 28 and compensating lens 12 remain centered on the line connecting point 5″ with the center of beamspliting interface 4″.

Similarly, the detector assembly 29 is constrained to rotate about point 6″ in plane 23 in such a manner that wave plate 30 and compensating lens 13 remains centered on the line connecting point 6″ with the center of beam-splitting interface 4″.

The above is accomplished by the mechanism illustrated in FIGURES 3–5. The apparatus includes a rigid frame 39 rotatable about an axis 40 through retroreflectors 1″ and 2″ (which are fixed). The rotatable frame 39 carries slide bars 41 on which the beamsplitter carrier 42 slides. Light beams 8″ and 10″ pass down the interior of a pair of telescoping tubes 43 and 44. Tube 43 is pivoted to beamsplitter carriage 42 at the center of beamsplitter interface 4″. Tube 44 is pivoted to rotatable frame 39 at the center of retroreflector 2″. The detector assembly 29 is rigidly attached to tube 44. The source assembly 24 is rigidly attached to a hollow tube 46 pivoted to frame 39 at the center of the retroreflector 1″. The tube 46 telescopically receives a hollow tube 47 which is also pivoted about the beam splitter carriage 42 at the center of the beam splitter. The light beams 7″ and 9″ pass through the tubes 46 and 47.

In operation, as the beam splitter 3″ moves along the rods 41, the ends of the tubes 43 and 46 move therewith and the tubes slide in tubes 44 and 47 while causing them to pivot about the centers of the retroreflectors 1″ and 2″. In consequence, each pair of tubes 43 and 44 and 46 and 47 maintain their respective alignments with each other and between their respective pivot points. Since tube 44 carries the detector assembly 29 and tube 46 carries source assembly 24 all components are maintained in alignment. The pivoting of the frame 39 about axis 40 through the retroreflectors 1″ and 2″ permits the maintenance of alignment in spite of vertical movement of the beam splitter. In order to further improve operation of the apparatus, servo-controlled beamsplitters may be employed to increase the stability of the carriage; linear motion may be treated as a special case of planar motion; and various means of monitoring deviations may be employed. These considerations are all illustrated in FIGURE 6 which illustrates schematically the arrangement of the optical components in a device for servo-controlling the linear motion of the diamond tool of a ruling engine.

Referring now specifically to FIGURE 6, numerals 1‴ and 2‴ denote two retroreflectors with centers at points 5‴ and 6‴ respectively. The numeral 11‴ denotes the plane which perpendicularly bisects the line joining points 5‴ and 6‴. Numerals 45 and 58 denote two compensated beamsplitters which are coplanar and are mounted on the same carriage (not shown in FIGURE 6). Ruling point 59 is also attached to said carriage. The motion of the carriage is normal to the plane of FIGURE 6. White light from a source (also not shown) illuminates retroreflectors 1‴ and 2‴ through beam splitter 45 in the manner already described in connection with FIGURES 1 and 2. The returning beams combine at beamsplitter 45 to form beam 48. Beam 48 is separated into two beams 50 and 51 by auxiliary beamsplitter 49. Beam 50 passes through red filter 52 and is focused on photodetector 54 by lens 53. Beam 51 passes through violet filter 55 and is focused on photodetector 57 by lens 56. If retroreflectors 1‴ and 2‴ are matched, the zero order of interference will occur when beamsplitter 45 coincides with plane 11‴. By adjusting the relative diameters of retroreflectors 1‴ and 2‴, the first minimum (i.e., order of interference ½) for green light can be made to occur when beamsplitter 45 coincides with plane 11‴. The first minimum for red light and that for violet light occur on opposite sides of this position. Thus, by balancing the output of detectors 54 and 57 the carriage can be servo-controlled so that beamsplitter 45 remains in plane 11‴. Such servo techniques fall well within the present state of the art. See for instance the article by George R. Harrison, Jour. Optical Soc. Amer., vol. 49, page 202 (1959), which includes references to previous work. A second source and detector system is used with beamsplitter 58 which is independently servo-controlled subject to the constraint that it is fixed to the same carriage as beamspliter 45.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. A system for determining at least lateral deviations of a member from planar motion comprising a beamsplitter mounted on said member with its plane substantially parallel to the plane of movement of said member, means for moving the member along said plane of movement, a beam of light directed at said beamsplitter to provide a reflected and a transmitted beam, a first and a second stationary reflective element disposed in the paths of the reflected and the transmitted beams respectively at initially substantially equal optical distances from said beamsplitter, said reflective elements being arranged to cause said latter beams to be reflected parallel to themselves at all positions of said beamsplitter over the limits of operation of said system, thereby to produce a single beam which is a composite of the beams reflected from said reflective elements, and means for detecting changes in the light intensity due to interference in said composite beam as an indication of the deviation of the member from planar motion.

2. A system for determining at least lateral deviations of a member from planar motion comprising a beamsplitter mounted on said member with its plane parallel to the plane of movement of said member, means for moving the member along said plane of movement, a beam of light directed at said beamsplitter to provide a reflected and a transmitted beam, a first and a second stationary reflective element disposed in the paths of the reflected and the transmitted beams respectively at initially equal optical distances from said beamsplitter, said reflective elements being arranged to cause said latter beams to be reflected parallel to themselves at all positions of said beamsplitter over the limits of operation of said system, thereby to produce a single beam which is a composite of the beams reflected from said reflective elements, and means for detecting changes in the order of interference, for a white light source as an indication of the deviation of the member from planar motion.

3. The combination according to claim 2 wherein said reflective elements are corner cube reflectors.

4. The combination according to claim 2 wherein said reflective elements are spherical retroreflectors with an index of refraction of approximately 2.

5. The combination according to claim 2 wherein said means for detecting comprises a light sensitive apparatus and aperture defining means for restricting the field of view of said light sensitive apparatus to less than one-quarter of an interference fringe.

6. The combination according to claim 5 further comprising means for maintaining said light sensitive apparatus and said aperture defining means aligned with said composite beam.

7. The combination according to claim 2 wherein said means for detecting includes reversible counting means for providing a digitized indication of the instantaneous displacement of the plane of said beam splitter from the plane of movement of said member.

8. A system for determining at least lateral deviation of a member from planar motion comprising a beamsplitter having its plane parallel to the plane of movement of said member, a beam of light directed at said beamsplitter such as to provide a reflected and a transmitted beam, a first and a second reflective element disposed in the paths of the reflected and the transmitted beams respectively at initially substantially equal optical distances from said beamsplitter and initially equal distances on opposite sides of its plane, said reflective elements being arranged to cause said beams to be reflected parallel to themselves and back to said beamsplitter at all positions of said beamsplitter over the limits of operation of said system, thereby to produce a single beam which is a composite of the beams reflected from said reflective elements, means for producing relative motion between said beamsplitter and said reflective elements along said plane of movement and means for detecting changes in the light intensity due to interference in said composite beam as an indication of the deviation of the member from planar motion.

9. A system for determining at least lateral deviation of a member from planar motion comprising a beamsplitter having its plane parallel to the plane of movement of said member, a beam of light directed at said beamsplitter such as to provide a reflected and a transmitted beam, a first and a second reflective element disposed in the paths of the reflected and the transmitted beams respectively at initially substantially equal optical distances from said beamsplitter and at initially equal distances on opposite sides of its plane said reflective elements being arranged to cause said beams to be reflected parallel to themselves and back to said beamsplitter at all positions of said beamsplitter over the limits of operation of said system, thereby to produce a single beam which is a composite of the beams reflected from said reflective elements, means for producing relative motion between said beamsplitter and said reflective elements along said plane of movement of said member and means for detecting changes in the order of interference in the composite beam as an indication of the deviation of the member from planar motion.

10. A system for determining at least lateral deviations of a member from planar motion comprising a beamsplitter mounted on said member with its plane substantially parallel to the plane of movement of said member, means for constraining said member to move in a plane substantially parallel to the plane of said beamsplitter, a beam of light directed at said beamsplitter to provide a reflected and a transmitted beam, a first and a second stationary reflective element disposed in the paths of the reflected and the transmitted beams respectively at initially substantially equal optical distances from said beamsplitter, said reflective elements being arranged to cause said latter beams to be reflected parallel to themselves at all positions of said beamsplitter over the limits of operation of said system, thereby to produce a single beam which is a composite of the beams reflected from said reflective elements, and means for detecting changes in the light intensity due to interference in said composite beam as an indication of the deviation of the member from planar motion.

11. The combination according to claim 10 wherein said means for restraining are such as to satisfy the relationships;

$$|\alpha| \leq \left|\frac{\lambda}{12L(d\phi)}\right|$$

and $$|\Delta| \leq \left|\frac{\lambda}{48(d\phi)}\right|$$

where $\alpha$ is the angle between the plane of the perpendicular bisector of the plane of the optical centers of said stationary reflective elements and the plane of said beam splitter, $\lambda$ is the wave length of the light, L is the distance between the optical centers of said stationary reflective elements, $d\phi$ is the maximum angle of divergence between the various rays of the composite beam and $\Delta$ is the distance between said perpendicular bisector and said plane of the beam splitter.

References Cited by the Examiner

UNITED STATES PATENTS

| 2,571,937 | 10/51 | Peck | 88—14 |
| 2,977,841 | 4/61 | Kaufmann et al. | 88—14 |
| 3,040,620 | 6/62 | Ferris | 88—14 X |

FOREIGN PATENTS

| 1,085,350 | 7/60 | Germany. |
| 773,238 | 4/57 | Great Britain. |

JEWELL H. PEDERSEN, *Primary Examiner.*

WILLIAM MISIEK, FREDERICK M. STRADER,
*Examiners.*